(No Model.) 6 Sheets—Sheet 2.

H. F. W. HUEG.
MACHINE FOR PREPARING AND SHAPING DOUGH.

No. 554,273. Patented Feb. 11, 1896.

Witnesses
William Mueser
M. Tanzer

Hermann F. W. Hueg Inventor
By his Attorney Henry Schreiter

ANDREW B. GRAHAM, PHOTO-LITHO. WASHINGTON, D.C.

(No Model.) 6 Sheets—Sheet 3.

H. F. W. HUEG.
MACHINE FOR PREPARING AND SHAPING DOUGH.

No. 554,273. Patented Feb. 11, 1896.

Witnesses
William Mueser
N. Tanger

Hermann F. W. Hueg Inventor
By his Attorney Henry Schreiter

(No Model.) 6 Sheets—Sheet 4.

H. F. W. HUEG.
MACHINE FOR PREPARING AND SHAPING DOUGH.

No. 554,273. Patented Feb. 11, 1896.

Witnesses
William Mueser
M. Tauser

Hermann F. W. Hueg Inventor
By his Attorney Henry Schreiter

(No Model.) 6 Sheets—Sheet 5.
H. F. W. HUEG.
MACHINE FOR PREPARING AND SHAPING DOUGH.

No. 554,273. Patented Feb. 11, 1896.

Witnesses
William Mueser
M. Panger

Hermann F. W. Hueg Inventor
By his Attorney Henry Schreiter (No Model.) 6 Sheets—Sheet 6.
H. F. W. HUEG.
MACHINE FOR PREPARING AND SHAPING DOUGH.
No. 554,273. Patented Feb. 11, 1896.

Witnesses
J. P. Nordstrom
R. J. Elliott

Hermann F. W. Hueg Inventor
By his Attorney Henry Schreiter

UNITED STATES PATENT OFFICE.

HERMAN F. W. HUEG, OF LONG ISLAND CITY, NEW YORK.

MACHINE FOR PREPARING AND SHAPING DOUGH.

SPECIFICATION forming part of Letters Patent No. 554,273, dated February 11, 1896.

Application filed April 23, 1895. Serial No. 546,856. (No model.)

*To all whom it may concern:*

Be it known that I, HERMAN FREDERICK WILLIAM HUEG, a citizen of the United States, and a resident of Long Island City, county of Kings, and State of New York, have invented certain new and useful Improvements in Machines for Preparing and Shaping Dough, of which the following is a full, clear, and exact specification, reference being had to the accompanying drawings, wherein—

Figs. 18 and 19 are longitudinal sections; Fig. 20, a view from below.

My invention relates to machines and appliances for preparing dough and for shaping bakers' wares therefrom; and it consists of novel devices and of combinations of them with some already known for preparing dough, shaping wares, and for conveying them into and through a fermenting-compartment and into and through a baking-oven, and of other labor-saving arrangements for the auxiliary manipulations connected therewith.

Figure 1:
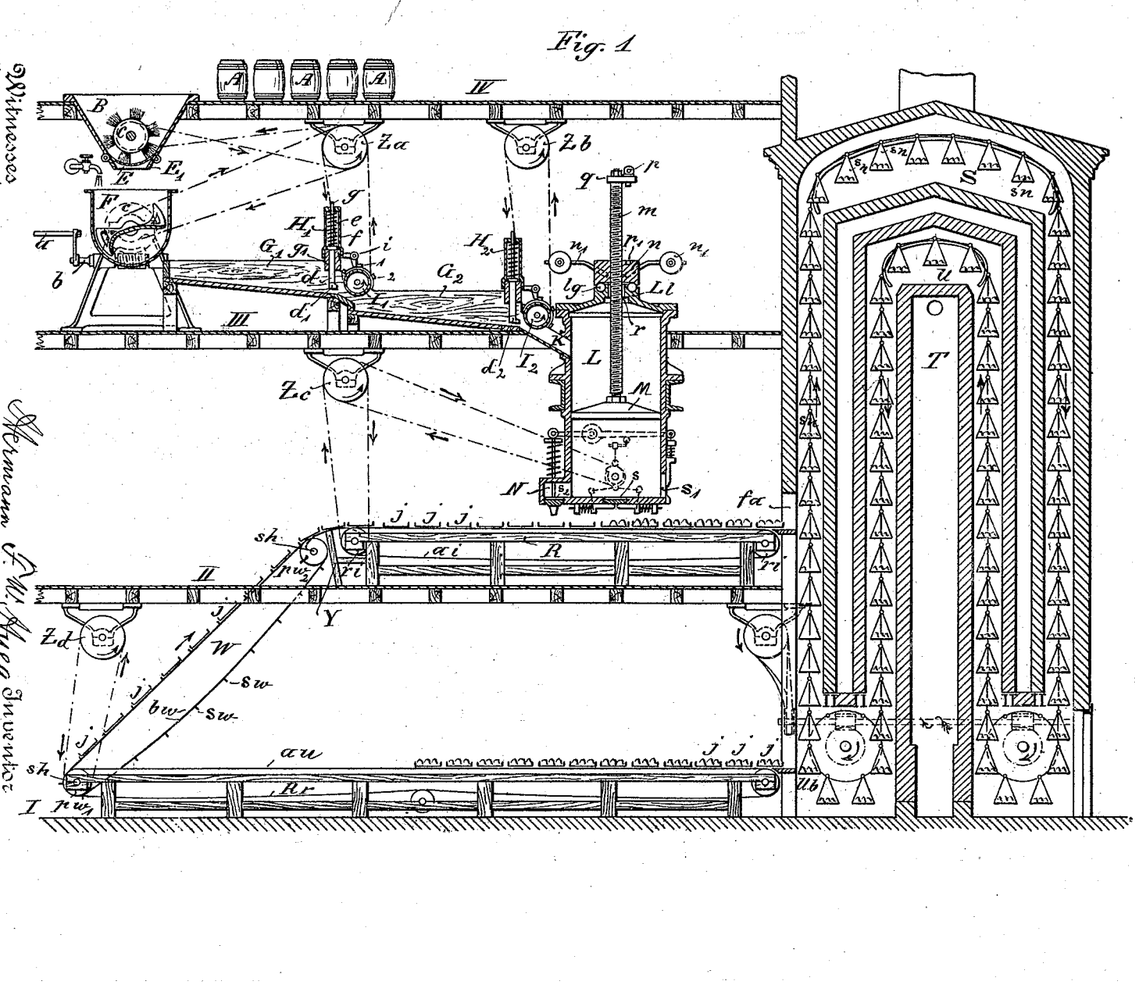
Figure 1 is a vertical longitudinal section showing the general arrangement of a bakery equipped with my improved machine for preparing and shaping dough and with other labor-saving devices combined therewith.

To better illustrate the successive working of the devices and appliances designed and combined in my apparatus, I have shown in Fig. 1 a general view (section) of a bakery equipped with my universal dough preparing and molding machine in connection with the other necessary apparatus.

The bakery is arranged upon four floors. The operation commences on the fourth or top floor. There the flour, stored in barrels, is filled into the funnel B and driven by rotary brush C through sieve E into the mixer F. Sieve E is stretched over a curved frame E' fitting the lower end of the funnel B and hinged to it to avoid the necessity of lifting out the rotary brush every time the sieve needs to be cleaned. The frame with the sieve may then be cleaned more easily and thoroughly than it could be done otherwise and no impurities retained on the sieve will fall into the mixer.

Mixer F, I do not claim as a part of my invention and shall therefore not go into a detailed description of it, stating solely that any well-working rotary mixer may be used for the purpose. The mixer is turnably set on pinions and may be turned over to empty the mixed dough in the trough G by turning crank $a$ set on worm-shaft $b$ and operating cog-wheel $c$.

After having been thoroughly mixed the dough is emptied into the trough G'. This trough is made preferably of lumber and has a slanting bottom to make the dough flow toward kneader H'. This kneader, set on the lower end of the trough, consists of a heavy plank $d$ provided with an iron shoe $d'$ on its lower edge and of the apparatus moving it up and down. In addition to its own weight plank $d$ is pressed down by two spiral springs $e$ inclosed in cylindrical cases $f$ and slid on pins $g$ passing through their tops. Near the upper edge on both ends of the plank $d$ are trunnions $h$ engaged by forked arms $i'$ of bell-cranks $i$, pivoted on braces $k$ and actuated simultaneously by wipers 1 2, &c., set in disks $l$ on both sides of roller I′. The wipers abut against the shorter arms of bell-crank levers $i$ and lift the kneader $d$ upward. The wipers are adjustably secured to the disks in diametrically-arranged grooves and held in position by set-screws $s\ c'$, $s\ c^2$, &c. The lift and rapidity of movement of the kneader may be regulated as the dough under operation may require by setting the wipers accordingly. When harder kneading is required, the wipers are set farther outward to give the kneader a higher lift. For preparing dough requiring less kneading, the wipers are set lower to lift the kneader only slightly above the dough, and some of them may also be receded entirely to lift kneader $d$ less frequently.

Figures 2, 3:
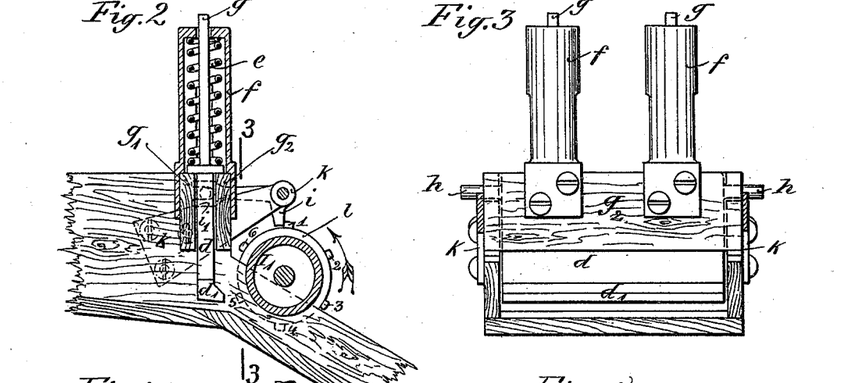
Fig. 2 is a vertical longitudinal section through the kneader.
Fig. 3 is an end view of the kneading-trough, partly in section, on line 3 3 in Fig. 2, showing also the front view of the kneader.

Kneader $d$ moves up and down between the guiding-planks $g'$ and $g^2$, upon which also the cylindrical cases $f$ are fastened with screws, as shown in Fig. 3. These cases are made of cast-iron with flat square flanges and slotted to allow the lifting of the kneader.

As the dough passes from beneath the kneader, roller I′ draws it into the trough $G^2$, where it undergoes a second kneading operation in a similar manner as described above. This second trough is arranged not only for the repetition of the kneading process—the dough being allowed to rise once in each trough—but also to enable the operator to work one dough through two different kneading processes, as is often required. Kneader $H^2$ is in every detail similarly equipped as kneader H′.

Figure 4:
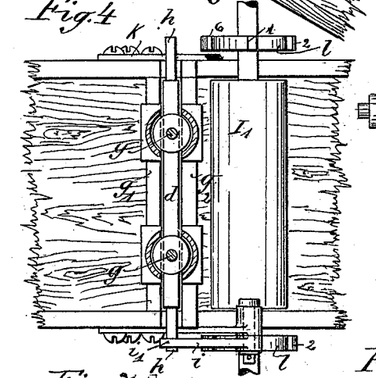
Fig. 4 is a top view of the kneading-trough and kneader and showing also the roller drawing dough from under the kneader.
Figure 5:
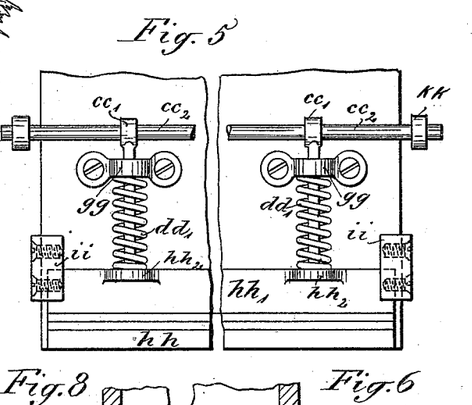
Figs. 5 and 6 are details of the dough-box, Fig. 5 being a front view, and Fig. 6 a vertical cross-section, of the side shaper.
Figure 6:
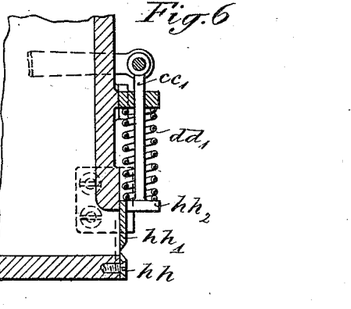

Rollers I′ and I² are made of wood strips, being glued together around a square axis, and their trunnions are pillowed in bearings adjustably supported on standards fastened to the floor.

Figures 15, 16, 17:
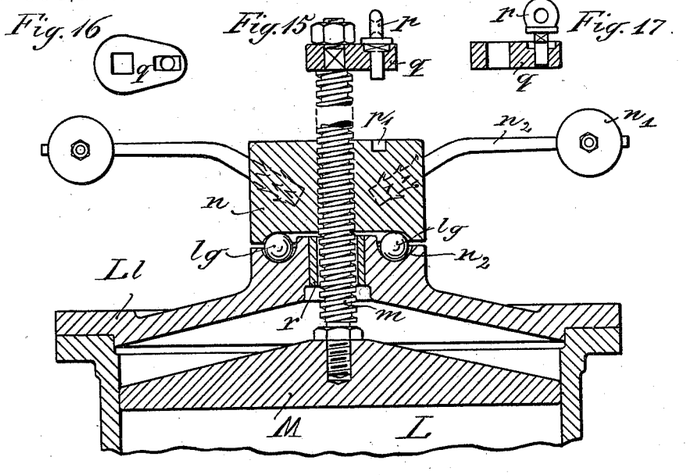
Fig. 15 is a vertical section of the top part of dough-box and of the piston and piston-rod.
Figs. 16 and 17 are details (top view and vertical longitudinal section, respectively) of the gravity-lock for locking screw-nut lifting the piston.

Roller I² draws the dough from under kneader $d^2$ and moves it on trough K into the square dough-box L, constructed of iron or lumber and covered with a strong lid L′, made of cast-iron. Piston M, made also of cast-iron, is snugly fitted in the box. Piston-rod $m$ glides smoothly through split bushing $r$ set in lid L′ and is provided with a screw-thread. Piston M is lifted by screw-nut $n$ revolving upon balls $l\ g$ running in circular groove $n^2$ on top of the lid. Before any dough is filled in the dough-box piston M is lifted up and when the box is filled nut $n$ is screwed upward on the piston-rod and fastened to the top piece $q$, set on the end of the piston-rod, by pin $p$ dropping into notch $p'$. The weight of piston M, supplemented by the weight of screw-nut $n$ and by weights $n'$ set on levers $n^2$, presses upon the dough and forces it through shapers $v$ inserted in apertures $s$ on the bottom or through aperture $s'$ on the side or into the auxiliary shaping-box N attached to the dough-box L and provided with suitable shaping devices.

Figure 9:
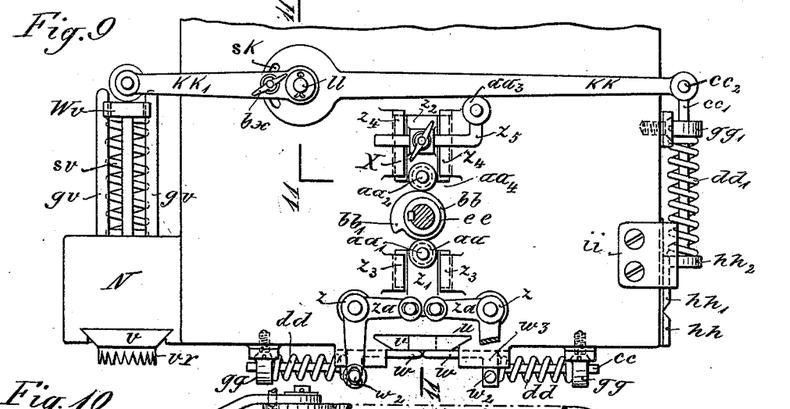
Fig. 9 is a front view of the lower part of the dough-box, showing mechanism for operating the dough-shaping devices.
Figure 10:
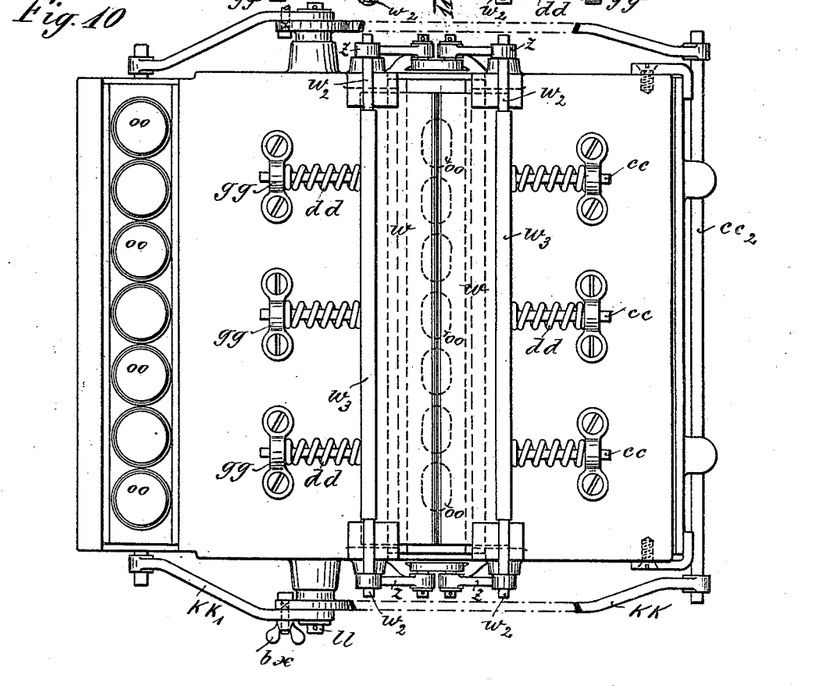
Fig. 10 is a view of the bottom of the dough-box seen from below.
Figure 11:
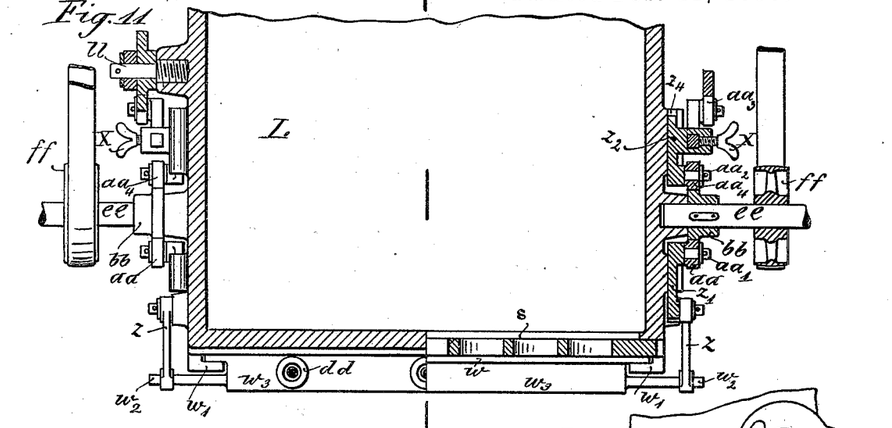
Fig. 11 is a section of the dough-box parallel with the side.

Aperture $s$ extends the whole width of the bottom of the dough-box and is provided with slanting edges, thus forming a swallow-tailed groove, into which shapers $v$, having several openings shaped according to different forms and sizes of wares, are inserted. Through these openings the dough passes in strips, taking their shape, and is further formed into wares by plates $w$ moving intermittingly apart and together in slots $w'$ beneath the shapers $v$ and co-operating in shaping the wares by molding and dividing them on ends. Plates $w$ are moved apart by eccentric cam $b$ $b$ revolving on stud $e\ e$ and pressing against roll $a\ a$ set on stud $a\ a'$ on top of sliding block $z'$. Arms $z\ a$ of bell-crank levers $z$ are connected to sliding block $z'$ and their other arms to pins $w^2$, screwed in the supports $w^3$, upon which the plates $w$ are mounted. Springs $d\ d$, slid on pins $c\ c$, screwed into supports $w^3$ and journaled in bearings $g\ g$, press the molding-plates $w$ together. As the eccentric cams $b\ b$ revolve, block $z'$ is pressed down, bell-crank levers $z$ move plates $w$ apart, suppressing springs $d\ d$ until ledge $b\ b'$ of the eccentric cam $b\ b$ passes roll $a\ a$, whereupon block $z'$ being relieved from pressure slides upward, and springs $d\ d$ force plates $w$ together. Eccentric cams $b\ b$ are keyed to studs $e\ e$, on which also driving-pulleys $f\ f$ are set. Similar mechanism is provided on the opposite side of the dough-box L and both act simultaneously, being driven from the same transmission. The dough is shaped accordingly as these plates $w$ move, and their movement again depends on the shape of the eccentric cams $b\ b$. When these cams $b\ b$ are shaped as shown in Fig. 9, the plates $w$ will slowly be moved apart, kept for a short period open, then suddenly closed. From following the action of the plates $w$ upon the dough in these movements it will be easily comprehended that the shape of wares produced in this case would be that of ordinary loaves of bread, if the apertures in shapers $v$ be correspondingly large, or of round rolls, if these apertures be small. Other forms of bakers' wares are obtained by employing shapers with appropriate openings and differently-shaped eccentric cams. Supposing the aperture in shapers $v$ be round and the eccentric nearly circular, then the dough would be shaped in form of long rolls known as "French" bread.

As it is not my purpose to claim in this application any special shape of the eccentric cams or of the apertures of the shapers $v$, and the working of the combination has been fully explained, I deem it sufficient to state only further in regard to this subject that cams $b\ b$, as well as shapers $v$, may be exchanged at any time.

The shaping and dividing mechanism on the side of dough-box L consists of one stationary plate $h\ h$ and of the moving plate $h\ h'$, guided in slots provided in guiding-blocks $i\ i$, screwed on each side of the box. This movable plate $h\ h'$ is pressed down upon the edge of plate $h\ h$ by springs $d\ d'$, slid on pins $c\ c'$, screwed in stops $h\ h^2$ and journaled in bearings $g\ g'$. Pins $c\ c'$ are connected to rod $c\ c^2$ and to lever $k\ k$, oscillating on the stud $l\ l$. This lever $k\ k$ is moved up and down in the following manner: Eccentric cam $b\ b$ presses against roll $a\ a^4$ revolving on stud $a\ a^3$, and moves sliding block $z^2$ in slots $z^4$ up and down. To this block $z^2$ is fastened arm $z^5$, carrying roll $a\ a^3$ by thumb-screw X. As the eccentric cam $b\ b$ revolves, arm $Z^5$ lifts lever $k\ k$ and consequently also plate $h\ h'$, and this lift may be adjusted by setting arm $z^5$ accordingly, as may be required, to press thicker or thinner stretches of dough between the plates $h\ h\ h\ h'$. The periodical movement of plate $h\ h'$ is dependent also on the shape of eccentric cam $b\ b$. When the eccentric cam $b\ b$ is shaped as shown in Fig. 9, plate $h\ h'$ is held in uplifted position for some time, allowing a streak of dough to pass out of the box, and when ledge $b\ b'$ of the eccentric cam $b\ b$ passes roll $a\ a^4$ springs $d\ d'$ will force plate $h\ h'$ down. By dropping upon the edge of the stationary plate $h\ h$ the plate $h\ h'$ will stop the outflow of the dough and cut off or separate the streak of dough pressed out of the dough-box while aperture $s'$ is held open.

Figure 12:
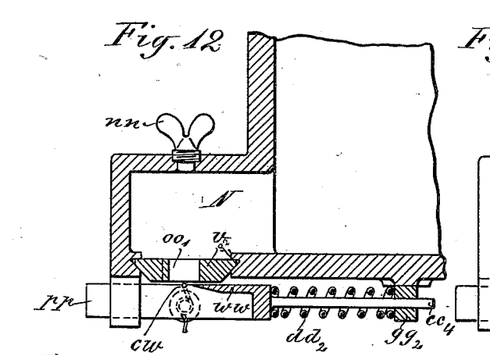
Figure 13:
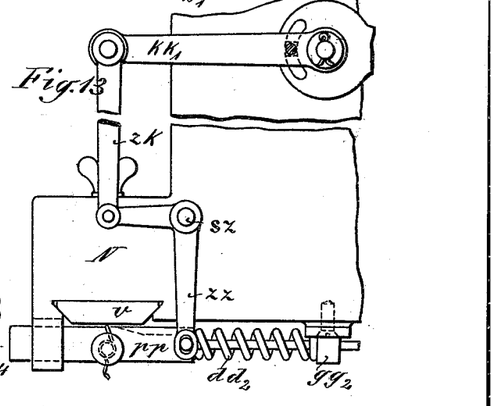
Figure 14:
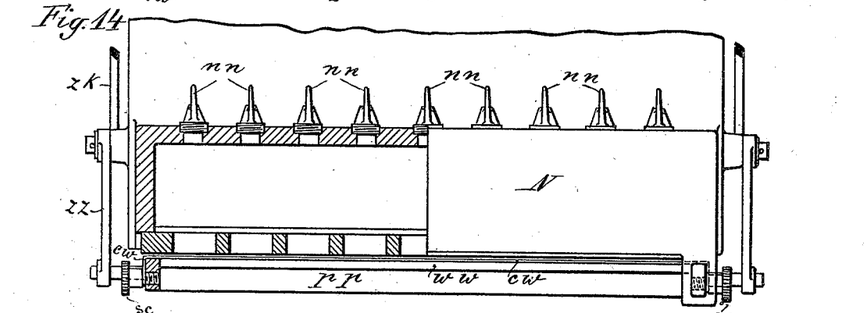

Auxiliary shaping-box N is attached to main dough-box L and equipped with appliances for shaping wares of thin dough. For this purpose slot $s^2$ (see Fig. 7) in the bottom is provided with grooves to hold shapers $v$. The wares are shaped either by pressing the dough through the apertures of the shapers and dividing it by a cutting-wire, as shown in Figs. 12, 13 and 14, or by means of special shaping devices, such as shown in Figs. 7, 8, 18, 19, 20, 21 and 22.

Figures 7, 8:
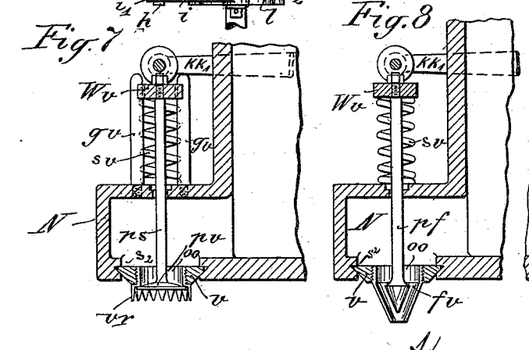
Figs. 7, 8, and 12 are vertical cross-sections, Fig. 13 a side view, and Fig. 14 a front view, one-half being a longitudinal section, of the auxiliary shaping-box, showing different attachments for shaping fluid dough and mechanism for operating these different attachments.

The device shown in Fig. 7 in section and in Fig. 9 in side views is adapted for molding different kinds of crullers. Apertures $o\ o$ of shaper $v$ are round and provided with screw-thread to receive rings $v\ r$ whose lower edge is serrated. In these rings move disk-shaped plungers $p\ v$, their stems $p\ s$ passing through the top of box N and being secured by screw-nuts in plate W $v$. The plungers $p\ v$ are held in uplifted position by recoil-springs $s\ v$ slid on the stem of the first and the last plunger, and pressing against plate W $v$, gliding up and down between guides $g\ v$. Levers $k\ k'$, operated through block $z^2$ and arm $z^5$ from eccentric cams $b\ b$, (shown in Fig. 9,) press plates $w\ v$ and the plungers attached to it down beneath the serrated edge of rings $v\ r$, thus forming a circular opening through which the dough is pressed out in the shape of a cruller with spirally round ribs.

Device shown in Fig. 8 is for shaping of biscuits, muffins and the like. Funnel $f\ v$ is screwed into shaper $v$, and plunger $p\ f$ is fitted to close the opening of the funnel when lever $k\ k'$ suppresses recoil-spring $s\ v$, holding plunger $p\ f$ in uplifted position. Lever $k\ k'$ may be adjusted according to the movement required to be made by the plunger $p\ f$. Lever $k\ k'$ oscillates on the same pin $l'$ with lever $k\ k$ and is secured to the latter by bolt $b\ x$ passing through slot $s\ k$, and thus lever $k\ k'$ may be adjusted in its position and lift, as required.

Figure 18:
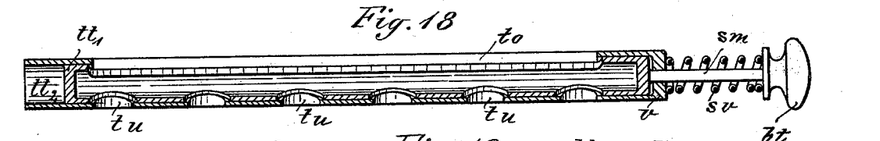
Figure 19:
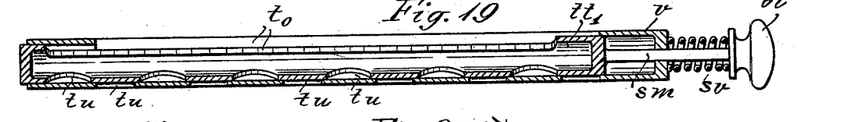
Figure 20:
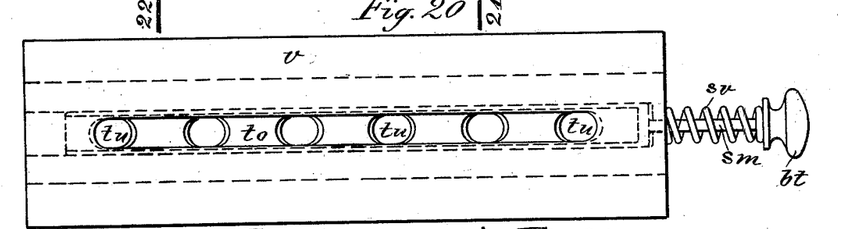
Figure 21:
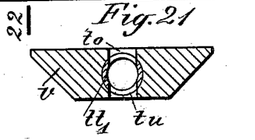
Figs. 21 and 22 cross-sections on lines 21 21 and 22 22, respectively, in Fig. 20, of an attachment to the dough-box for shaping small wares.
Figure 22:
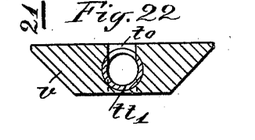
Figure 23:
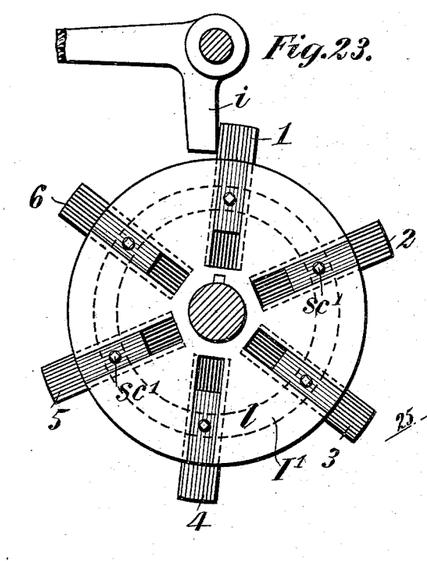
Fig. 23 is an elevation of the kneader-operating mechanism, showing the disk with the adjustable wipers inserted therein.
Figure 24:
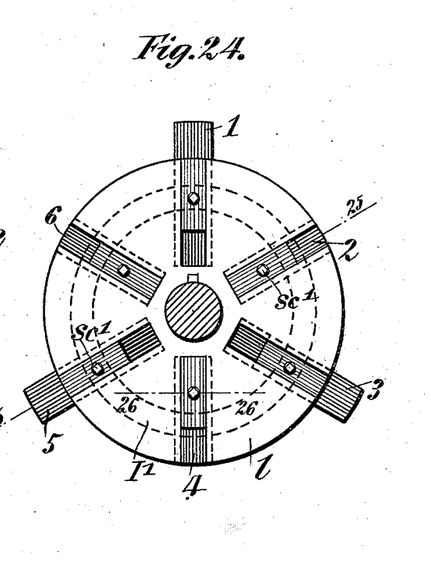
Fig. 24 is an elevation of the wiper-disk, showing several of the wipers receded.
Figure 25:
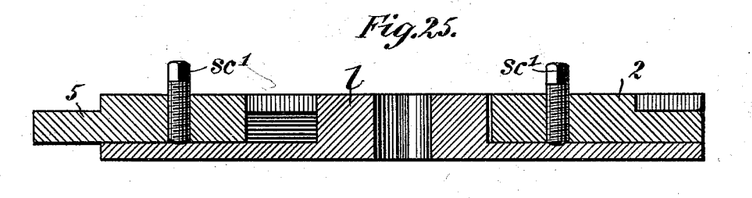
Fig. 25 is a longitudinal and Fig. 26 a cross section, on lines 25 25 and 26 26, respectively, showing details of arrangement of the wipers.
Figure 26:
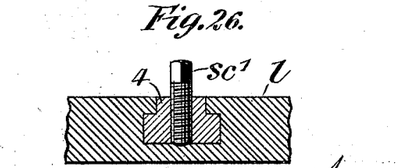

The shaping device shown separately in Figs. 18 and 19 in longitudinal section, in Fig. 20 in top view, (inserted in shaper $v$,) and in Figs. 21 and 22 in cross-sections, consists of tube $t\ t$ inserted in shaper $v$ and having corresponding longitudinal apertures $t\ o$ on top and also corresponding circular openings $t\ u$ on bottom. Tube $t\ t$ is shorter than boring $t\ t^2$ in shaper $v$ and is fitted to slide within. Stem $s\ m$ secured to tube $t\ t'$ projects outward from shaper $v$ and terminates in push-button $b\ t$. Between this push-button $b\ t$ and shaper $v$ recoil-spring $s\ v$ is slid upon stem $s\ m$, holding the tube $t\ t$ in such position that the dough is permitted to pass through opening $t\ u$. By pushing the tube inward in position, as shown in Fig. 19, the flow of dough through these openings is cut off and the parts passed through divided. This device is employed for shaping muffins, round cakes and the like, and may be operated either mechanically or by hand.

The shaping device shown in Figs. 12, 13 and 14 is employed for producing differently-shaped jumbles and similar wares. For this purpose shapers $v$, having several apertures of appropriate form for the wares to be produced, are inserted in slot $s^2$ (see Fig. 7) of the box N, and the openings in top are closed by thumb-screws $n\ n$. Frame $p\ p$, open on top and carrying cutting-wire $c\ w$, stretched over it and fastened by set-screws $s\ c$, and sharp-edged plate $w\ w$ slides in guides underneath shaper $v$. Cutting-wire $c\ w$ and also plate $w\ w$ are actuated by springs $d\ d^2$, slid on pins $c\ c^4$ and pressing frame $p\ p$ forward, bell-crank lever $z\ z$, fulcrumed on stud $s\ z$, whose one arm is attached to frame $p\ p$ and the other connected by link $z\ k$ to lever $k\ k'$, moves frame $p\ p$ back, suppressing springs $d\ d^2$ between it and bearings $g\ g^2$. The transmission of the movements follows from eccentric cam $b\ b$ in similar manner, as explained above.

Only one of the described devices is used and operated at a time, and the two other apertures are closed and the corresponding parts of the operating mechanism disconnected. Thus when the aperture on the bottom is used the mechanism operating the shaping devices on both sides of the dough-box is rendered inoperative by removing arm $z^5$, secured to block $z^2$, and lever $k'$ is loosened by unscrewing thumb-screw $b\ x$. When the aperture on the side of the box is to be used, the mechanisms operating the other two (on the bottoms of the main end of the auxiliary box) are disconnected by removing pins $w^2$ and by loosening lever $k'$, as described above, and when the auxiliary box is to be used the mechanisms operating the two other apertures are disconnected by removing pins $w^2$ and rod $c\,c^2$, connecting lever $k\,k$ with pins $c\,c'$. In all these cases the unused apertures are held closed by the action of the springs $d\,d$, $d\,d'$ and $d\,d^2$ respectively.

The molded wares are allowed to drop upon pans $j$ passing beneath dough-box L upon a moving endless apron $a\,i$, stretched over rollers $r\,i$ on table R, and conveyed thereupon to the opening $f\,a$, where the pans are transferred to carriers $s\,n$ conveying the wares into the fermenting-compartment S, arranged around the baking-oven T. Carriers $s\,n$ convey the pans with wares in a continuous train through the fermenting-compartment S and through baking-chamber U to opening U $b$ on the ground floor, where pans $j$ with baked wares are conveyed on moving apron $a\,u$ along table R $r$ to delivery. The emptied pans $j$ are then transmitted on conveyer W again to table R (on the second floor) passed on movable apron $a\,i$ beneath the dough-box L, filled with new wares and passed again on the circuit through the fermenting-chamber and baking-oven.

Conveyer W consists of two narrow belts $b\,w$, running over pulleys $p\,w'$ and $p\,w^2$ and provided with stops $s\,w$. Pulleys $p\,w'$ and $p\,w^2$ are keyed to shafts $s\,h$ so wide apart to allow pans $j$ to be laid across both of them, stops $s\,w$ holding them in position. Arriving at pulleys $p\,w^2$, where the belts turn downward again, the pans are pushed over bridge Y and, each succeeding pan pushing the forward one, transferred to the moving apron $a\,i$ on table R. The conveyer is driven by belt from shaft Z $d$ driving also the moving apron $a\,u$ on table R $r$. Moving apron $a\,i$ on table R is driven from shaft Z $c$ driving also in eccentrics $b\,b$ of the dough-box. This arrangement is made to have the speed of all revolving movements in proper proportion to each other and to enable the operator to maintain a proper relative speed in the several parts of the apparatus while changing the speed of the several operations.

The mechanism for moving carriers $s\,n$ through the fermenting-compartment and through the baking-chamber, and for transmitting them from one into another, is the same as described in my application filed January 10, 1895, Serial No. 534,457.

I do not claim such parts or combinations of the apparatus described in this specification as are already used or known, nor such as I have claimed in my above-cited application.

What I claim upon this specification is—

1. In an apparatus for preparing dough the combination with a trough having bottom slanting to one end, of a kneader situated on the lower end of the trough and consisting of a pestling-plank with projecting trunnions near its upper edge, set between suitable guides, and pressed down by recoil-springs slid on pins, set on the upper edge of the plank and journaled in the tops of cylindrical cases inclosing the springs and fastened to the guides, and slotted, to admit lifting of the pestling-plank between the guides, and of bell-cranks pivoted to braces, secured to the sides of the trough; the bell-cranks being actuated by wipers pushing against their shorter arms and engaging with their forked arms, the projecting trunnions of the pestling-plank, lifting it intermittingly as the wipers abut against their other arms.

2. In an apparatus for preparing dough, the combination with bell-cranks pivoted on braces and engaging the trunnions of a pestling-plank, lifting it intermittingly between guides, of disks with diametrically-drawn grooves, wherein wipers, are adjustably secured, adapted to increase or reduce the stroke and speed of the movement of the pestling-plank without changing the speed of the wiper-disks and of the other parts of the apparatus.

3. In an apparatus for preparing dough, a pestling-plank with projecting trunnions, elbow-levers, pivoted on braces and engaging with their longer forked arms the trunnions of the pestling-plank; a shaft, a roller and the wiper-disks having diametrically-formed grooves secured thereon, and wipers, adjustably secured in the grooves of the disks; the wipers abutting against the shorter arms of the elbow-levers, thereby actuating the pestling-plank, and the roller, drawing the dough underneath the pestling-plank.

4. In an apparatus for preparing and shaping dough, comprising a dough-box with a weighted piston, pressing the dough through shaping devices set in apertures provided in the bottom and sides of the dough-box, the combination with the piston-rod, sliding through the lid of the dough-box and provided with screw-thread, of a screw-nut revolving upon ball-bearings on the top of the lid, lifting the piston, and also serving as a weight on the piston, and provided with levers to which additional weights are attached.

5. In an apparatus for preparing and shaping dough, comprising a dough-box with a weighted piston and a shaping-box attached to it, the combination with shapers, having appropriately-formed apertures for shaping wares of the dough, of a frame actuated by springs and connected by bell-crank levers to mechanism moving it intermittingly beneath the shaper and carrying a cutting-wire stretched over the frame and fastened to it by screws, and a sharp-edged plate, following the cutting-wire and shutting the apertures of the shaper immediately as the cutting-wire separates a part of the shaped dough.

6. In an apparatus for preparing and shaping dough, comprising a dough-box, having apertures adapted to receive shaping devices and mechanism for operating the shaping devices, the combination with a lever pivoted on a stud of the dough-box and operated by an arm adjustably secured to a sliding block, moved up and down by an eccentric cam pressing against it, of an arm, transmitting the motion of the lever to the shaping devices, and attached to it by a bolt, set in circular slot, provided in the lever, the arm being capable of adjustment, whereby the motion of the lever transmitted to this arm may be modified.

HERMAN F. W. HUEG.

Witnesses:
 M. TANZER,
 E. C. NIELSON.